United States Patent [19]

Sorg et al.

[11] Patent Number: 5,573,569
[45] Date of Patent: Nov. 12, 1996

[54] METHOD FOR CONDITIONING AND HOMOGENIZING A GLASS STREAM

[75] Inventors: Helmut Sorg, Glattbach; Richard Sims, Lohr am Main, both of Germany

[73] Assignee: Beteiligungen Sorg GmbH & Co. KG, Lohr/Main, Germany

[21] Appl. No.: 524,165

[22] Filed: Aug. 31, 1995

Related U.S. Application Data

[63] Continuation of Ser. No. 175,283, Dec. 29, 1993, abandoned.

[30] Foreign Application Priority Data

Jun. 15, 1993 [DE] Germany .......................... 43 19 776.6

[51] Int. Cl.$^6$ .......................... C03B 5/18; C03B 5/225; C03B 5/23
[52] U.S. Cl. .......................... 65/135.1; 65/135.3; 65/136.4; 65/346
[58] Field of Search .......................... 65/135.1, 135.3, 65/136.4, 137, 346, 326, 337, 178

[56] References Cited

U.S. PATENT DOCUMENTS

| | | |
|---|---|---|
| 2,394,893 | 2/1946 | Brown . |
| 3,582,310 | 6/1971 | Avery et al. . |
| 3,645,712 | 2/1972 | Ihrig et al. . |
| 4,029,488 | 6/1977 | Rhett . |
| 4,416,375 | 3/1978 | MacPherson et al. .................... 65/137 |
| 4,652,293 | 3/1987 | Samejima et al. .................... 65/136.4 |
| 4,693,740 | 9/1987 | Noiret et al. .................... 65/136.4 |
| 4,738,706 | 4/1988 | Picinelli .................... 65/137 |
| 4,764,198 | 8/1988 | Lythgoe .................... 65/346 |

FOREIGN PATENT DOCUMENTS

| | | |
|---|---|---|
| 0212539 | 3/1987 | European Pat. Off. . |
| 2410763 | 9/1974 | Germany . |
| 2507015 | 9/1975 | Germany . |
| 3119816 | 1/1983 | Germany . |

OTHER PUBLICATIONS

Publication entitled "Glass-Making Today", P. J. Doyle Portcullis Press Redhill, 1979, p. 199.

Richard Sims, "Increased Conditioning Time Leads to Improved Thermal Homogeneity", Glass Industry magazine, Nov., 1991, pp. 8–15.

Primary Examiner—Donald E. Czaja
Assistant Examiner—Steven P. Griffin
Attorney, Agent, or Firm—Hill Steadman & Simpson

[57] ABSTRACT

A continuously flowing glass stream is conditioned and homogenized along a conditioning stretch, which extends from an entry side to at least one extraction point, and at the beginning of which there is a cooling zone, to which a homogenizing zone for the glass temperature is connected. This method is preferentially used for the manufacture of molded glass articles, such as containers and pressed articles. In order to achieve the necessary conditioning and homogenization, even at high throughputs, the glass stream in the cooling zone has a cross section with a depth/width ratio D/W of a maximum 0.6 or 0.5, or 0.4, or 0.3, or 0.2, whereby the maximum depth Dmax amounts to a) 300 or 250 or 200 mm when the cooling zone is situated in a working end or in a distribution channel
 b) 150 or 120 or 100 mm when the cooling zone is situated in a feeder or in a forehearth and, at least 30, or 40 or 50% of that amount of energy which corresponds to the necessary temperature reduction is removed from the glass bath per meter of flow path at the beginning of the cooling zone.

15 Claims, 5 Drawing Sheets

METHOD FOR CONDITIONING AND HOMOGENIZING A GLASS STREAM

This is a continuation of application Ser. No. 08/175,283, filed Dec. 29, 1993, now abandoned.

BACKGROUND OF THE INVENTION

The invention concerns a method for conditioning and homogenizing a continuously flowing glass stream in a conditioning stretch, which extends from the inlet side to at least one outlet and at the beginning of which there is a cooling zone, followed by a homogenizing zone for the glass temperature, whereby the temperature in the conditioning stretch is reduced from the inlet temperature $T1$ to the working temperature $T2$, preferably for the production of molded glass articles such as containers and pressed glass articles.

Whereas the temperatures necessary for melting glass depend on the con,position, on the production process an on other factors, the temperatures required for processing the glass are normally lower than the melting temperatures of the glass. Consequently the glass must be cooled between the melting and working processes. Cooling of the glass s a part of the so-called "conditioning", during which the glass is prepared for processing. The achievement of the level of thermal homogeneity necessary for the particular working process is also part of the conditioning of the glass.

Conditioning of the glass can only take place when the glass has left the actual melting unit. In the past, the conditioning was mainly carried out in the so-called forehearths or feeders. Nowadays the so-called working end or distribution channel are also used for conditioning.

Certain developments in the recent past have radically changed the situation concerning the cooling of glass. Various improvements have been made in the melting furnaces which have resulted in a significant increase in the specific melting capacity, i.e. the melting capacity related to the area of the melting zone. Consequently the temperature of the glass leaving the furnace has increased. Other melting aids, such as bubblers or bottom heating, which have the effect of increasing the glass temperature on the bottom of the melting tank, have also led to an increase in the temperature of the glass leaving the melting tank.

Continual improvements have also made to glass processing machines, amongst other things to increase the throughput. Whereas in the 1960's and 1970's machines for the mass production of containers were equipped with 6, 8 or 10 stations each for two gobs, nowadays 12 to 16 stations each for two gobs or ten stations each for three or four gobs are used. The throughput capacity of individual machines has therefore been greatly increased.

As a result of the factors mentioned above, significantly more heat must now be removed from the glass after it has left the melting tank and before it is worked than in the past. The increase in the throughput of the individual machines has also reduced the residence time of the glass in those parts of the system where the glass conditioning takes place. Thus, a greater amount of heat must be removed in a shorter time. This results in the fact that the productivity of the complete production line depends to a large extent on the cooling capacity along the conditioning stretch. However, numerous technical problems must also be taken into consideration.

As a result of the relatively high viscosity of the glass, the flow of glass in working ends and forehearths, the basic form of which is normally a channel, is laminar. It is usual for a velocity profile to be established in the glass bath, in which the maximum lies approximately in the center of the flow channel on the glass surface. Since the viscosity depends on the temperature of the glass, there is an interaction between the glass temperature, the heat losses and velocity of the glass. Wherever the velocity in a particular area is lower, the resulting increase in the residence time leads to higher heat losses. Thus the temperature sinks even further, and the increased viscosity leads to an additional decrease in the velocity.

At a constant throughput a reduction of the velocity in one area automatically leads to an increase in the velocity in other areas with higher glass temperatures. This results in a reduction of the residence time in the higher temperature areas and so reduces the effective cooling capacity. For this reason the area of the glass bath affected by a cooling system must be clearly defined, and, as far as possible this cooling area must avoid areas in which there are low flow velocities.

Areas of low temperatures and higher viscosity produce an effective reduction in the flow cross-section, which in turn leads to an increased drop in the glass level between the melting tank and the extraction point. This can also result in production disturbances.

Furthermore, when glass of a certain composition is cooled below a specific temperature limit crystals can be formed, a process known as "devitrification". This process can also cause significant disturbance in the production. Therefore the cooling of the glass bath to temperatures below the devitrification temperature should be avoided. As crystal formation depends on both the temperature and time, the residence time of the glass in the critical temperature range is also an important factor.

The transport of heat within the glass bath itself is almost completely by radiation, whereby the transport velocity depends on the glass composition. For example, the presence of ferrous iron or chromium, which are used as coloring agents in green glass, reduces the rate of heat transport in the glass bath in comparison with a colorless glass. This results in a delay in the heat transport from the lower areas of the glass bath. If the cooling is applied too late, then no effective cooling effect can be observed in the lower areas of the glass bath before the glass reaches the extraction point.

Numerous cooling systems for glass conditioning are known, in most of which the heat transport is primarily by radiation. This type of heat removal is advantageous because the heat is not removed directly from the glass surface, but from a layer of the glass bath, the thickness of which depends on the radiation transmission of the glass. The Stefan-Boltzmann Law is used to calculate the amount of heat transported by radiation. An important factor in this mathematical function is the temperature difference between the radiator and receiver. Applying this function to the case being considered here, the temperature of the radiator is the temperature of the glass, which is determined by the operating conditions of the installation, and, as such, is not a variable in mathematical terms. Therefore the temperature of the receiver determines the amount of heat which is removed.

German patent DE-PS 24 10 763 teaches that the roof of a forehearth channel can be shaped so that a channel, open at the bottom is formed along the center of the forehearth. A stream of cooling air can be passed longitudinally along this channel between the forehearth roof and the glass bath. This produces a temperature difference between the glass in the forehearth and the lower surface of the roof, so that the glass radiates heat to the cooled area of the roof. It is advantageous here that the roof, acting as the radiation absorber, is cooled directly by the cooling air. However, the amount of energy transmitted is determined by the temperature to which the roof can be cooled. In practice the lower surface of the roof cannot be lower than several hundred° C., which limits the actual cooling capacity available per unit length of forehearth. The effective temperature of the radiation absorber, and so the amount of heat which is removed, is varied by varying the amount of air passing along the channel. The cooling air entering the channel is much colder than the inside of the channel, so that the air heats up quickly. If a large amount of air is introduced however, density differences may occur between the colder air and the surroundings, so that convective air movements take place. This leads to the risk of direct cooling of the glass surface by the cooling air, which will result in an acceleration of the hot glass stream below the surface, and consequently to a reduction in the effective cooling capacity of the system.

U.S. Pat. No. 3,582,310 describes an apparatus in which the cooling air channel is separated from the glass melt by means of an intermediate cover, to prevent direct cooling of the glass surface. However the cooling efficiency is also reduced by this cover, as a temperature gradient is established in the intermediate cover, which leads to a higher temperature on the lower side of the cover. This again has a limiting effect on the rate of heat removal from the glass.

A more effective cooling system is described in European Patent 0 212 539. Openings are made in the roof of the conditioning stretch, the effective area of which can be varied by means of sliding tiles. In this way the surroundings are used as a radiation receiver, with the rate of heat transferred being determined by the effective area of the openings. Even in the worst case the temperature of the surroundings is under 100° C., and is therefore much lower than the temperatures which can be reached by radiation receivers in other systems. The cooling capacity per unit area is therefore much higher with this system. However, the radiation openings create a chimney effect and therefore cause convective air movement. Such movements are difficult to control and can lead to control problems.

Even when the cooling capacity is basically sufficient, there may still be problems with cooling the lower layers of the glass bath, which retain too high a temperature, particularly in colored glasses.

European patent application EP-OS 2 195 598 teaches that cooling air can be blown through holes in plates directly onto the glass surface. If a high cooling capacity is necessary, which is the case when the glass throughput is increased, a sort of skin forms on the glass surface, below which glass with a higher temperature and lower viscosity continues to flow at a higher velocity.

U.S. Pat. No. 3,645,712 describes an apparatus comprising a row of plate shaped heat exchangers which can be installed along the complete length of a feeder or forehearth. A cooling medium flows through these heat exchangers, which are not immersed in the glass bath. This cooling can be made very effective by the use of the appropriate cooling fluid, but the temperature only sinks slowly along the whole length of the forehearth, so that the remaining channel length is not sufficient to achieve the necessary homogenization of the temperature over the whole depth of the glass bath. Although the bottom is raised just after the glass enters the forehearth, this publication still recommends the use of a considerable depth in the glass bath.

U.S. Pat. No. 4,029,488 describes cooling units installed in the bottom of the channel at the forehearth entry, such that the glass flows over the cooling units, which are thereby said to exert an intensive cooling effect. At the beginning of the forehearth two cooling units are installed in line along the center line of the channel, and only afterwards are two more cooling units installed side by side. Therefore a strong cooling effect only takes place at some distance from the forehearth entry. This type of cooling unit extracts heat only from the layer of glass directly in contact with it, which is of necessity on the bottom of the channel. In practice it is difficult to move this layer, even when stirrers are used. The stirrers cannot be installed deep enough to pick up the cold bottom layer as this would cause too much corrosion to the refractories. Furthermore the depth of glass in the channel is relatively high, so that it is difficult to achieve even a more or less homogeneous temperature distribution.

U.S. Pat. No. 2,394,893 teaches the use of a rake-like, cooled stirrer to systematically stir up the contents of a working end. This solution requires a complicated apparatus, and still does not achieve homogenization of the temperature distribution, as there is not sufficient distance available for temperature equalization at the different outlets of the working end.

German Patent DE-PS 25 07 015 describes the use of water cooled stirrers in the melting tank itself, between a melting and refining section with a high temperature on the one hand and a refining zone with a lower temperature on the other hand, in order to increase the homogenization and to improve the quality of the glass. However this requires a longer melting tank, and the problems connected with further cooling and temperature homogenization before the processing of the glass are not solved.

Finally, it is known from German Patent Application DE-OS 31 19 816 that it is possible to divide a forehearth into five zones, the first two of which are a rapid cooling zone and a fine cooling zone. The glass is mechanically stirred in the third zone, and the fourth zone is an equalizing section for homogenizing the temperature before the glass enters the fifth zone, in which the normal gob is formed. Enclosed channels are provided in the roof and the bottom of both the rapid cooling and fine cooling zones for the selective or simultaneous flow of a cooling fluid. The heat removal per unit length of the two cooling zones is, however, still limited, so that the glass flows through a zigzag-shaped channel, in which additional electrodes are installed to heat the glass in the so-called "dead corners". Cooling and additional heating of the glass must therefore be carried out simultaneously, so that large quantities of heat are passed from the additional heating zones to the cooling zones.

SUMMARY OF THE INVENTION

An object of the present invention is therefore to provide a method of the type described initially, in which both a strong cooling effect and good homogenization are achieved in the conditioning stretch at a high throughput.

As already demonstrated, these objectives are diametrically opposed to one another to a certain extent.

This object is achieved according to the invention by the application of the method described initially in which the cross section of the glass bath in the cooling zone has a depth/width ratio DIW of maximum 0.6, whereby the maximum depth Dmax is:

a) 300 mm when the cooling zone is situated in a working end or in a distribution channel, b) 150 mm when the cooling zone is situated in a feeder or in a forehearth and in which at least 30% of the amount of energy which corresponds to the temperature difference between T1 and T2 is removed from the glass bath per meter of length at the beginning of the cooling section.

Expressed more simply, the aim of the invention is to create an area with a very shallow glass bath, at least at the beginning of the conditioning stretch, and to remove as much heat as possible from this shallow area, so that, depending on the length of the conditioning stretch, the longest possible homogenizing zone is available, in which the remaining temperature differences can be equalized.

This leads to the fact that the situation improves when the depth/width ratio D/W is reduced, for example to 0.5, 0.4, 0.3, 0.2 or lower. It is clear that all intermediate values are also advantageous.

Clearly, the advantages increase as the depth is reduced, for example, when the cooling zone is located in a working end or in a distribution channel, and the maximum depth Dmax can be made less than 300 mm, such as 250 mm, or 200 mm, or even less.

The glass bath depth in feeders or forehearths are normally less, so that in such cases it is advantageous to reduce the maximum depth from 150 mm to 120 mm, or 100 mm or less. Intermediate values are also possible in this case.

The extremely shallow glass bath depths mentioned here are not self-evident at the high throughputs required today. The reason for this is that a drop in level of the glass occurs along the length of the cooling zone and the remaining channel, the extent of which depends on the flow velocity. The flow velocity, and therefore the glass level drop, increases significantly with shallower glass baths.

It is obvious that the glass depth cannot be reduced below a certain minimum value in each specific case. These values can be determined by experiment.

It is also the intention of the invention to utilize shallow bed cooling, with which it is possible to use known cooling systems to remove extremely a large proportion of the heat which is equivalent o the temperature difference between T1 and T2 in a relatively short distance.

The temperature T1 is that at the outlet of the melting tank or that at the entry of the conditioning stretch, whereas temperature T2 is the temperature at the first or only extraction point. Temperature T1 is a result of the operating conditions required in the melting tank and typically lies in the range of 1350° to 1400° C. Temperature T1 is normally higher when the throughput or melting tank capacity is higher. Temperature T2 is determined by both the type of glass and by the forming process for the glass gobs normally produced, and typically lies in the range of 1120°–1180° C. The use according to the invention of a wide and shallow channel (for a given throughput or a given flow velocity) permits an extremely high level of cooling in the shortest possible distance with a simultaneous reduction in the differences in the flow velocity and in the temperature, and therefore also in the viscosity. Significant advantages are achieved if at least 30% of the amount of energy equivalent to the temperature difference between T1 and T2 is removed from the glass bath per meter of length at the beginning of the cooling zone. However it is particularly advantageous if the cooling effect is intensified and 40% or, if possible, 50% of the amount of energy equivalent to the temperature difference mentioned is removed from the glass bath per meter of length in the cooling zone.

As already mentioned, it is possible to use known measures or methods for removing heat. Bottom cooling can be achieved by means of cooling channels installed in the bottom of the conditioning stretch and/or by means of reduced insulation in the bottom area. Furthermore it is possible to install surface cooling, either as an alternative or an addition, by means of variable openings in the roof, and/or by blowing in a gas, such as air and/or by means of cooling units which are installed above the glass surface without touching the glass bath. Finally it is also possible to cool in the glass itself, for example with cooling units which are submerged in the glass and which can also have the same effect as stirrers.

Known methods can also be used for the subsequent temperature homogenization in the glass. Such methods include a homogenization zone of the appropriate length with the best possible thermal insulation to the surroundings, uncooled stirrers or deflector plates, and also gentle heating of the glass from above by means of radiation or within the glass by means of direct electrical resistance heating and appropriate heating electrodes.

The use of shallow bed cooling in accordance with the invention brings all the glass under the influence of the cooling system for a short time. In particular, the bottom of the glass bath is also subject to cooling, for example, by means of significant radiation upwards. This effectively suppresses the negative effects of the interactive relationships between temperature, viscosity, residence time and glass flow, which are otherwise found.

The installation of the cooling cell right at the beginning of the conditioning stretch is of particular importance, as the temperature at this location is very high and the viscosity of the glass is very low.

The application of shallow bed cooling to the shortest possible length according to the invention allows the use of a basically linear channel, so that so-called "dead corners" can be avoided, as can additional heating of the glass in these dead corners. Furthermore the design of the cooling zone is made much more simple and the temperature distribution is homogenized to a large extent in the cooling zone.

The invention also concerns an apparatus for the execution of the method with a conditioning stretch for the contiluous flow of a glass stream, which stretches from the point of entry to the at least one extraction point, at the beginning of which there is a cooling zone, followed by homogenization zone for the glass temperature.

In order to fulfill the aim of the invention the apparatus according to the invention is characterized by the fact that in the cooling zone the cross section of the glass bath has a depth/width ratio D/W of maximum 0.6, whereby the maximum depth Dmax is:

a) 300 mm when the cooling zone is situated in a working end or in a distribution channel, or b) 150 mm when the cooling zone is situated in a feeder and/or in a forehearth.

In connection with the reduction of these values the explanations given above are valid.

BRIEF DESCRIPTION OF THE DRAWINGS

Examples of the invention are explained in more detail below, with the aid of FIGS. 1 to 12.

DETAILED DESCRIPTION OF THE PREFERRED EMBODIMENTS

Unless otherwise stated the pairs shown in section consist of the normal ceramic or mineral furnace and insulation materials.

Figure 1:
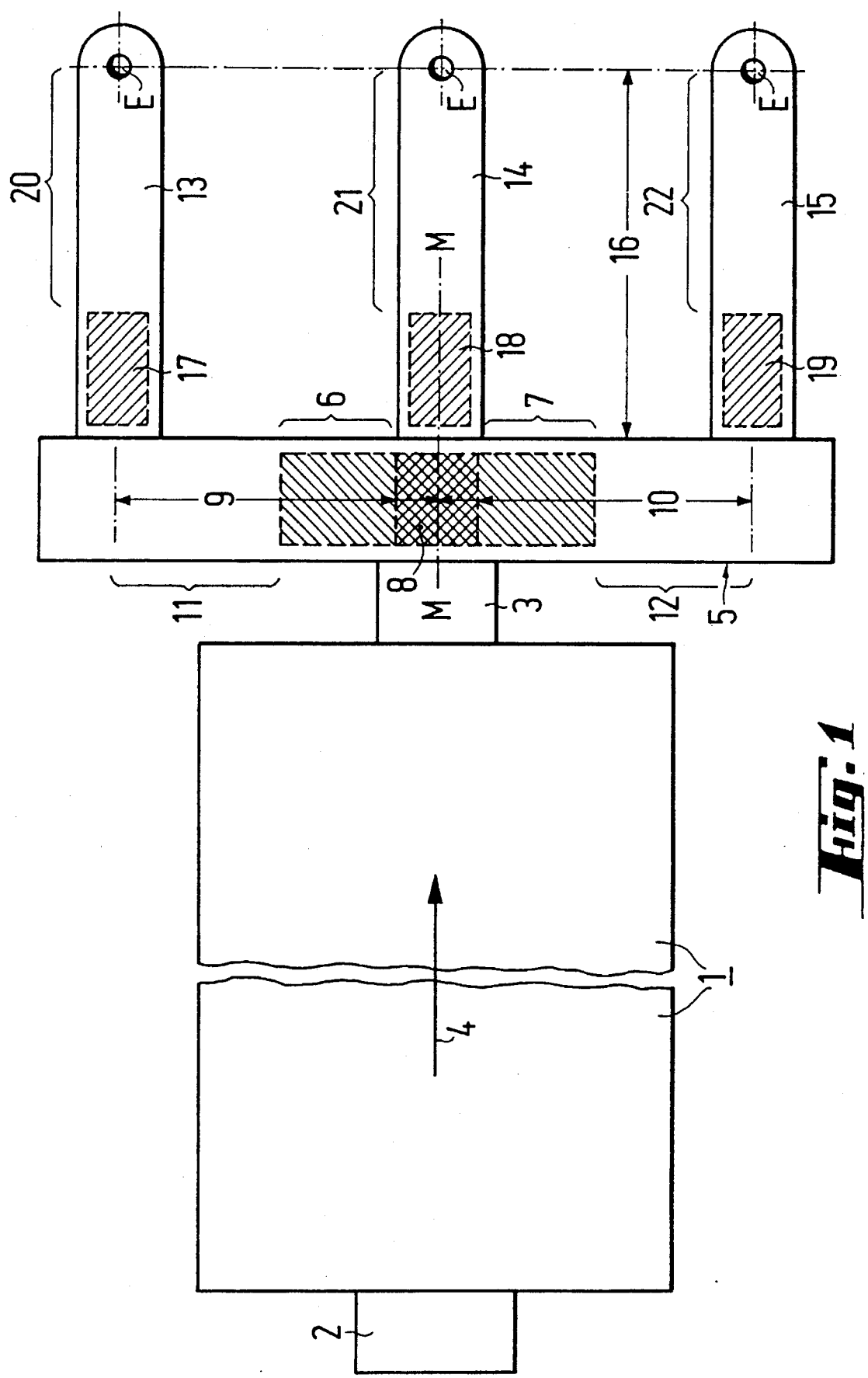
FIG. 1 is a schematic plan view of a melting tank, distribution channel and three forehearths, each with one extraction point.

FIG. 1 shows a melting tank 1, with a charging opening 2, which is normally constructed as a "doghouse", and the throat 3, through which the glass is removed from the melting tank. The glass formers, which can consist of the usual batch and cullet, and the resulting glass, flow through the melting tank in the direction of arrow 4. It is also possible to install several charging openings along both long sides of the melting tank, which produces a different flow pattern in the melter. A so-called riser can also be part of the throat 3. Such details are state of the art, so that no further particulars must be given here.

The distribution channel 5, which can also be constructed as a working end, is connected to the throat 3. In a first example of the invention two cooling zones 6 and 7, which are indicated by hatching and are enclosed within a dotted line, are located one on each side of a central plane M—M. It is also possible to join these two cooling zones into a single cooling zone, in which case the cross hatched area 8 is then added.

Two conditioning stretches 9 and 10 are formed on both sides of the center line M—M, to which cooling zones 6 and 7 and, when applicable, area 8, belong. The remaining parts of the channel then form the homogenizing zones 11 and 12. Homogenization of the temperature distribution is achieved as far as possible in the homogenizing zones.

In a second example of the invention three forehearths or feeders 13, 14 and 15 are connected to the distribution channel 5, each ending in an extraction point E. The total lengths of the forehearths 13, 14 and 15 in this example each constitute a conditioning stretch 16. In each of these conditioning stretches 16 there is a cooling zone 17, 18 or 19, which is marked by hatching and enclosed within a dotted line. It is emphasized that the diagram has been kept very simple in order to aid understanding. A homogenization zone 20, 21 and 22 follows each cooling zone in each of the conditioning stretches 16. In the example shown it is possible to do without the cooling zones 6, 7 and 8 in the distribution channel 5, so that the glass enters the forehearths at a very high temperature.

Figure 2:
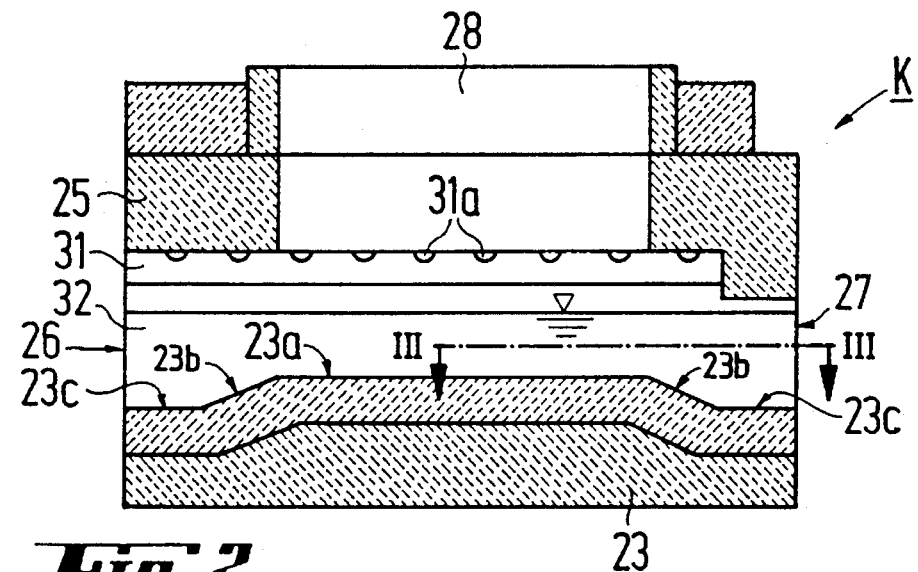
FIG. 2 is a longitudinal section through a cooling zone with radiation openings in the roof.
Figure 3:
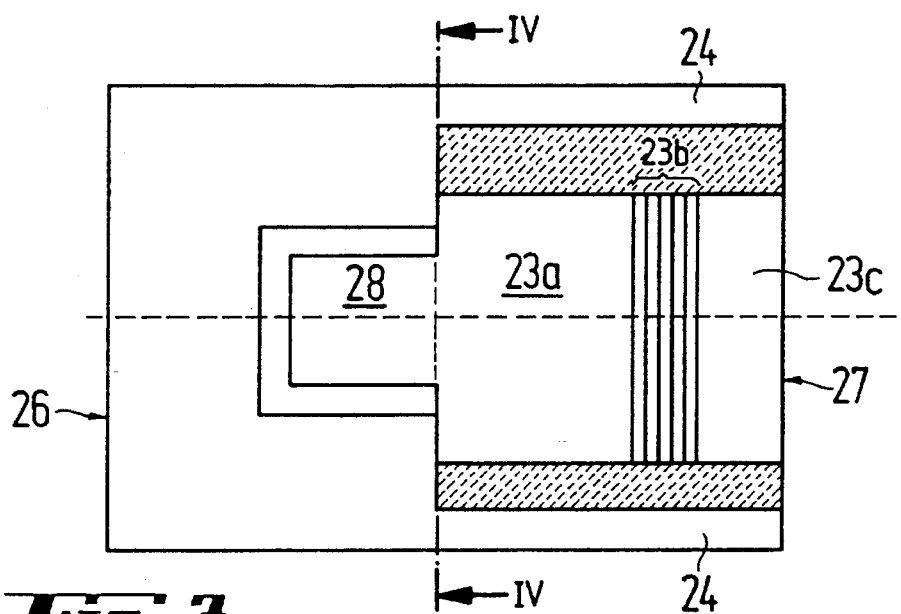
FIG. 3 is on the left hand side is a plan view of the object shown in FIG. 2, and on the right hand side a section along the line III—III in FIG. 2 is shown.
Figure 4:
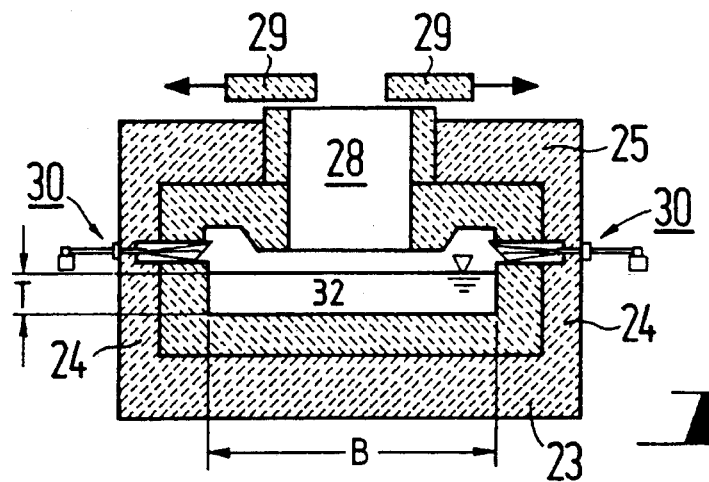
FIG. 4 is a cross section through the object shown in FIG. 3 along line IV—IV.

FIGS. 2, 3 and 4 show different views and sections of a cooling zone K, which can be installed as the cooling zones 6 and 7 in the distribution channel 5, or as the cooling zones 17, 18 and 19 in the forehearths 13, 14 and 15. The cooling zones concerned represent a length of channel with a bottom 23, side walls 24 and a roof 25. The glass enters from the inlet side 26 and exits on the outlet side 27. In the example shown in FIGS. 2 and 3 a rectangular shaped opening 28 is provided in the roof 25, which allows loss of heat by radiation from the glass. In order to be able to control the flow of energy to the surroundings, covers 29 are located on top of the opening, by means of which the effective size of the opening 28 can be varied. The opening and closing movement is indicated by arrows. In both side walls 24 there are rows of burners 30 (FIG. 4), the nozzles of which are installed in the burner blocks 31. The burner blocks have openings 31 a for the outlet of the combustion gases, which are shown in FIG. 2 as semicircles as the upper half is more or less hidden by ribs which reach down from the cover 25, as approximately shown in FIG. 4.

FIGS. 2 and 3 show that the bottom 23 has a raised area 23a over a length which roughly corresponds to the length of the opening 28. This raised area covers the complete width B of the channel cross section. The raised area 23a is connected to the lower bottom level 23c at both ends by means of sloping areas 23b. It can be clearly seen that the glass 32 is reduced to a very shallow cross section across this raised area 23a, which makes the high cooling capacity possible. The individual homogenizing zones follow on from the outlet side 27.

Figure 5:
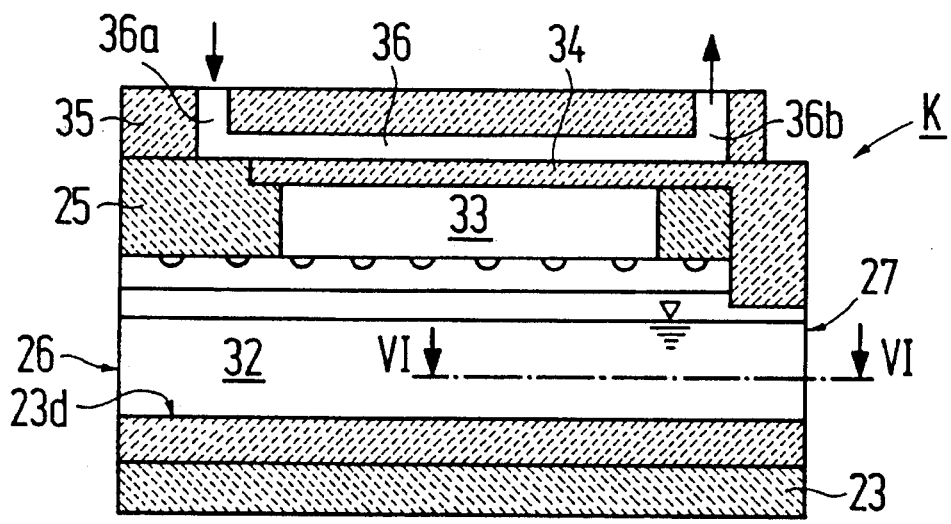
FIG. 5 is a longitudinal section through a cooling zone similar to that shown in FIG. 2, but with an enclosed cooling channel in the roof.
Figure 6:
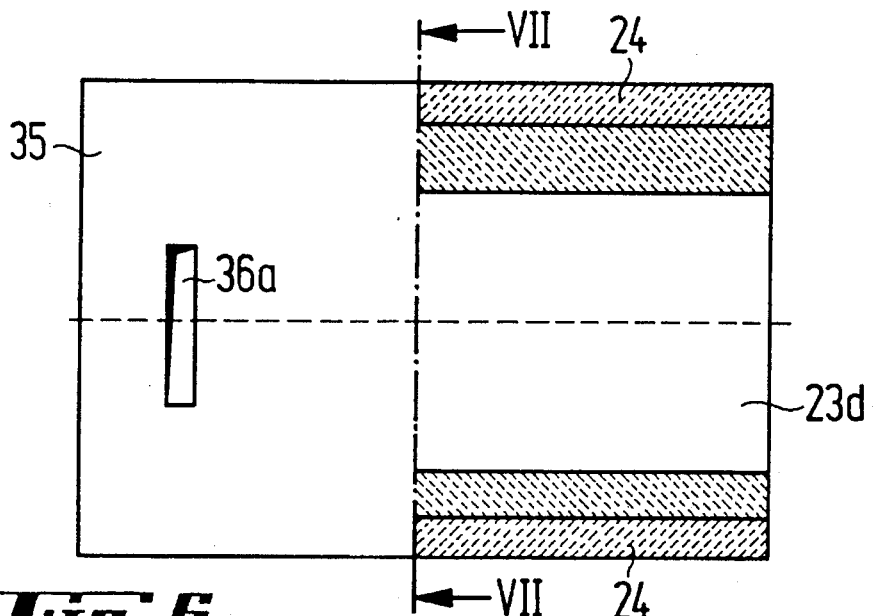
FIG. 6 is on the left hand side is a plan view from above the object shown in FIG. 5, and on the right hand side a section along the line VI—VI in FIG. 5 is shown.
Figure 7:
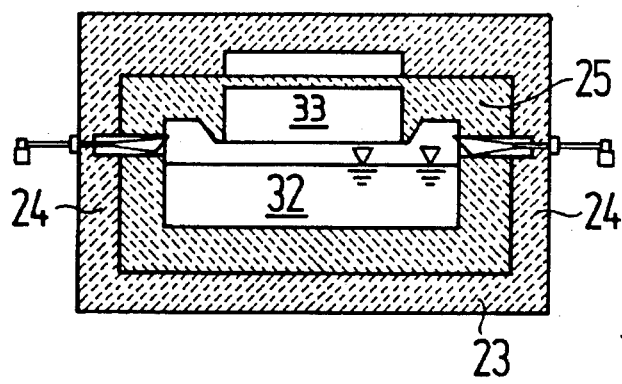
FIG. 7 is a cross section through the object shown in FIG. 6 along line VII—VII.

The FIGS. 5, 6 and 7 show a further version of the cooling zone K, in which a hole 33 in the roof 25 is covered with a plate 34, which in this case forms the radiation receiver for the heat radiated by the glass bath 32. A U-shaped channel 36 for the passage of cooling air is provided above the plate 34 within the superstructure refractory 35. The entry 36a and exit 36b of the channel 36 point upwards; the flow direction is indicated by arrows. The temperature of the plate 34 is influenced by the quantity of cooling air used, and the cooling effect on the glass bath is thereby varied. In the example shown in FIGS. 5, 6 and 7 the bottom 23 is flat. In this case the level inside surface 23d is at such a height that the channel section is wide and shallow.

Figure 8:
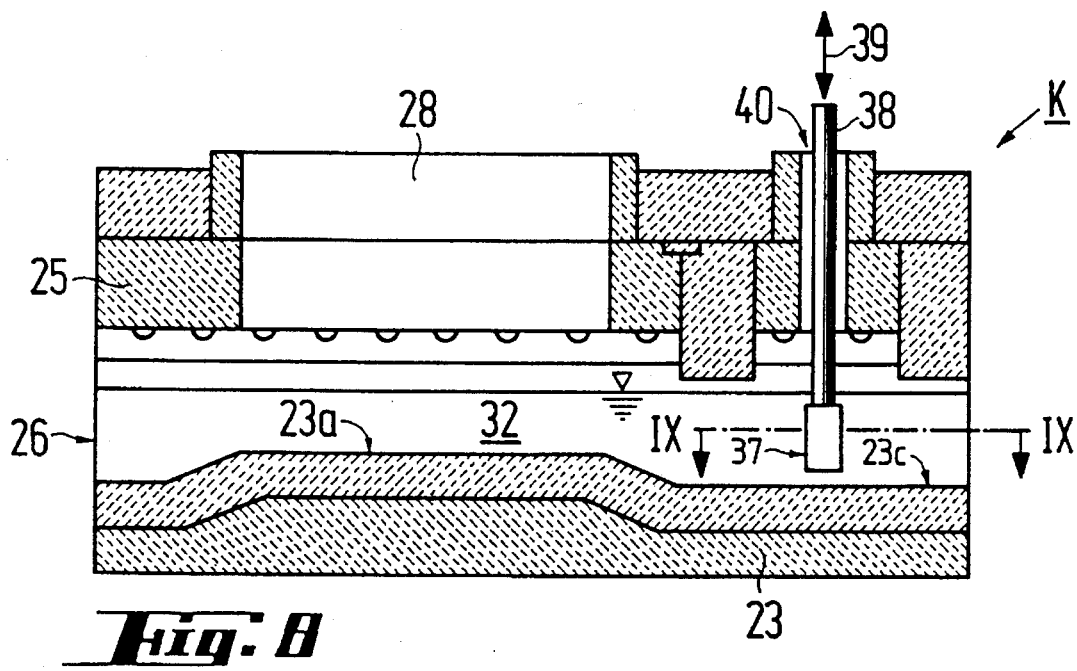
FIG. 8 is a longitudinal section through a cooling zone, which is extended to include a submerged cooling unit in the form of a barrier.
Figure 9:
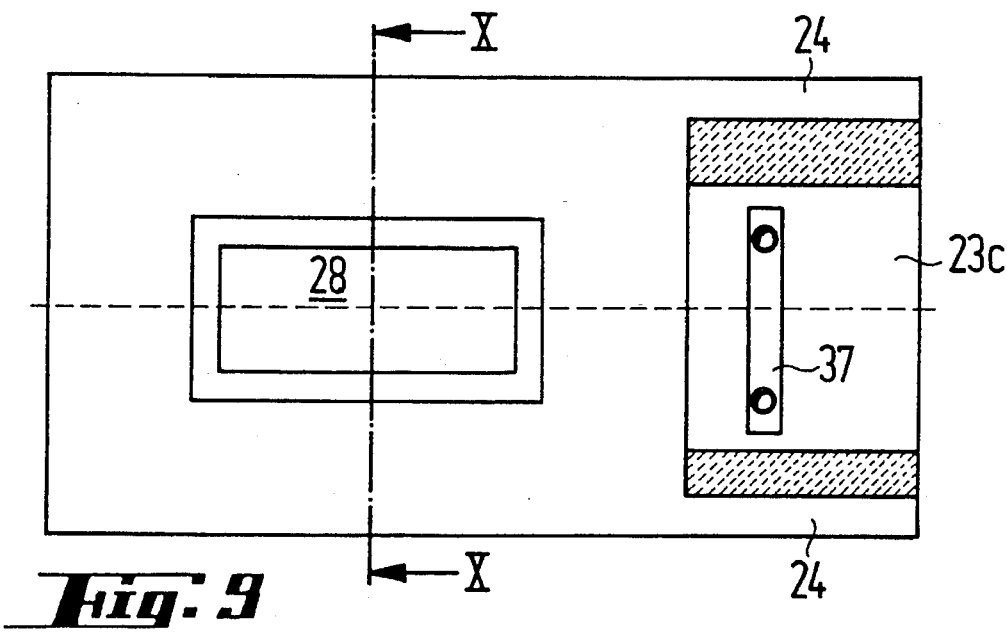
FIG. 9 is on the left hand side is a plan view from above of the object shown in FIG. 8, and on the right hand side a section along the line IX—IX in FIG. 8 is shown.
Figure 10:
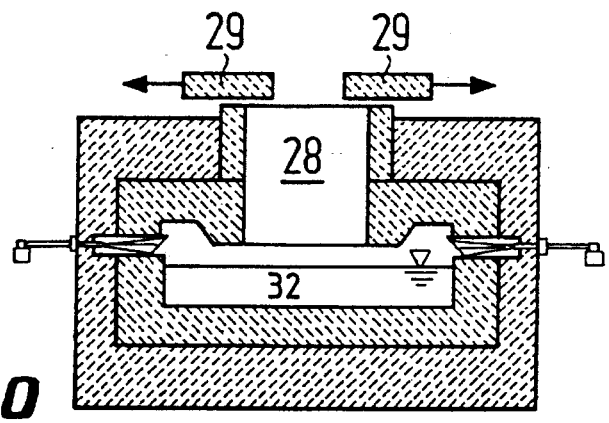
FIG. 10 is a cross section along line X—X through the object shown in FIG. 9.

The example shown in FIGS. 8, 9 and 10 is different from those previously described, in that, whilst otherwise maintaining similar geometric proportions to those in FIGS. 2, 3 and 4, a further area is provided after the raised area 23a of the bottom 23. In this further area a submerged cooling device 37 is installed above the lower bottom level 23c, the cooling device being supplied with a cooling medium via two vertical pipes 38. The supply pipes 38 can also be designed as concentric pipes, but this variant is not shown in detail. The cooling effect in the upper and/or lower regions of the glass bath 32 can be varied by raising or lowering the immersion cooling device 37 in the direction of the double arrow 39. The cooling effect can also be increased by periodic crosswise movement (perpendicular to the glass flow). Combined movements of the immersion cooler are also possible. It is also very easy to install the immersion cooler 37 in the form of a stirrer, in order to achieve additional homogenization of the temperature in the glass bath. The supply pipes 38 pass through an opening 40 in the roof 25.

Figure 11:
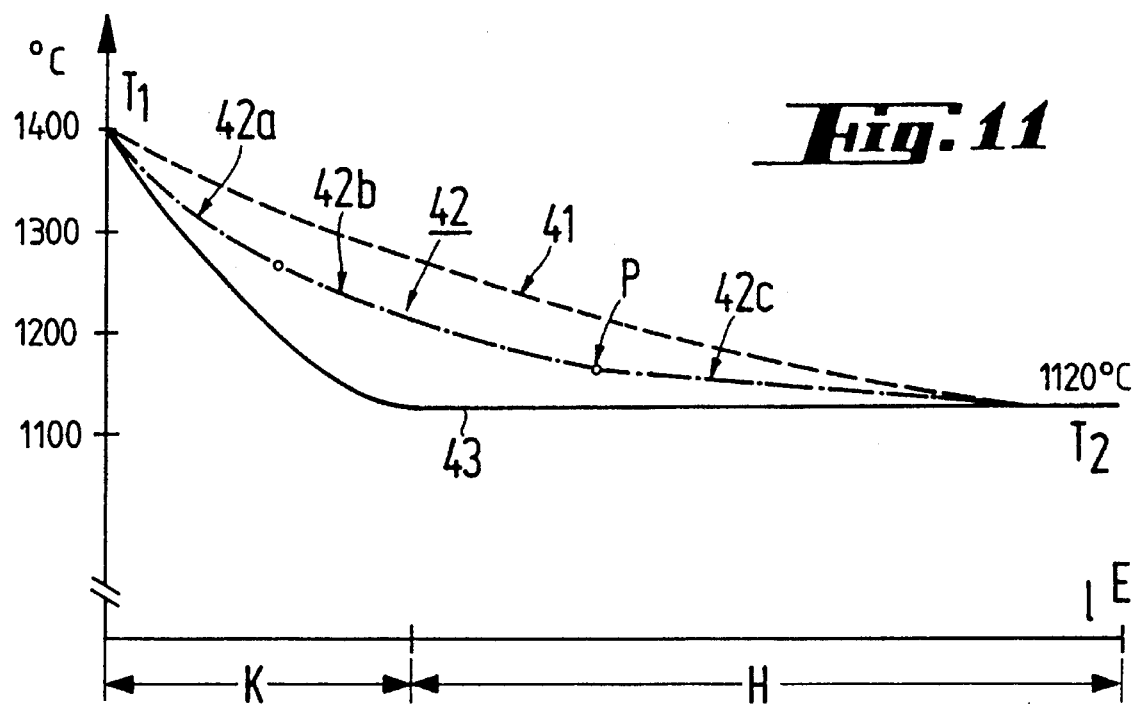
FIG. 11 graphically shows temperature curves at several measuring points along the complete length of the conditioning stretch.

Line 41 in FIG. 11 shows the temperature curve along a length "T" of a conditioning stretch according to the state of the art. In this case cooling takes place vertically upwards along the complete length of the conditioning stretch. In this way heat is removed from the glass bath along the complete conditioning stretch treatment stretch, so that it is not possible to achieve sufficient homogenization of the temperature distribution at the extraction point E. All values used in FIG. 11, and the values T1 and T2, represent average glass temperatures.

Line 42 shows the conditions with an apparatus according to German Patent Application DE-OS 31 19 816. Part 42a of the line shows relatively fast cooling in the so-called rapid cooling zone, whereas the much slower cooling in the so-called fine cooling zone is shown by part 42b, and part 42c shows the situation in the equalizing or homogenizing zone. The length of the flow path within the rapid and the fine cooling zones is indicated by point P between the line sections 42b and 42c. A relatively long glass flow path was necessary as a result of the relatively deep glass bath, but it was still not possible o reach the low average temperature which was desired in the length available. Therefore, given the fixed total length of the conditioning stretch there is not sufficient length remaining for the temperature equalization or homogenization, and further energy also had to be removed from this area.

The method according to the invention is characterized by line 43. With a wide, shallow glass bath the average temperature is reduced significantly along the relatively short cooling zone K, which is shown by the steep temperature curve. In this way, with a given total length, there is a relatively long stretch available for the homogenization zone H, along which the average temperature remains largely unchanged. Despite the steep temperature drop in the cooling zone K and the even average temperature in the homogenization zone H the edge zones on both sides of the wide glass bath may be heated additionally, as shown for the cooling zone in FIGS. 2 to 10 (burner arrangement). Attention must merely be paid to the attainment of the best possible homogeneous temperature distribution, by the combined effect of shallow bed cooling, edge and, where necessary, surface heating. However a relatively long flow path is available in the homogenization zone, and in the cooling zone conditions have been established which ensure that the temperature differences at the individual points of the glass bath cross section are not too great at the entry to the homogenizing zone. As the glass depth is small compared with the width B the heat losses through the side walls 24 are reduced, which also improves homogeneity and saves energy.

Figure 12:
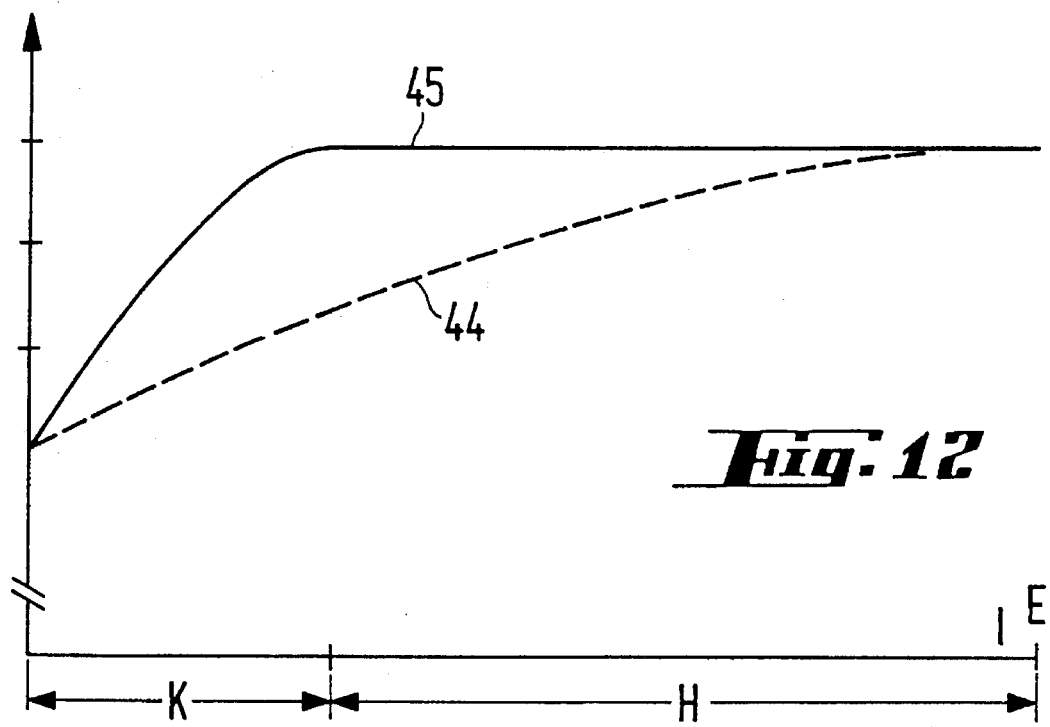
FIG. 12 graphically shows viscosity curves at several measuring points along the complete length of the conditioning stretch.

The lines 44 and 45 in FIG. 12 depict he variation of the average viscosity with a state of the art system (line 44) and according to the invention (line 45). The use of the shallow bed cooling increases the average viscosity very much earlier, whereby a more even flow velocity is achieved across the complete flow cross section, together with a better temperature homogeneity. The intensive shallow bed cooling systematically counteracts high flow velocities at high temperature locations and low viscosities as the cooling directly affects virtually all areas of the glass bath.

When the complete situation is considered it is clear that it is particularly important to install the section with the highest cooling capacity as near to the beginning of the conditioning stretch as possible. In the case of distribution channels or working ends this means as soon as possible after the throat of the melting tank, and, with forehearths or feeders, as soon as possible after the glass has entered this part.

By consideration of the invention special attention should be paid to the high throughputs or average flow velocities and temperature differences. Modern working ends have average flow velocities of 4.5 to 5.5 m/h at high loads. In a working end dimensioned and operated according to the invention, with a glass bath 1500 mm wide and 150 mm deep, which gives a ratio of D/W=0.1, very good results were achieved with throughputs of 100 to 150 tons/day. The flow velocities were approximately 7–11 m/h, without any detrimental effect on the temperature homogeneity of the glass at the extraction point.

Forehearths normally have smaller cross sections and so higher current velocities occur. However, the average flow velocities here of at least 8 m/h, which can be achieved with the invention, are very good values, if the required thermal homogeneity is achieved at the same time. In accordance with the invention the average flow velocities in forehearths can even be increased to 17 m/h and above, without affecting the required average temperature T2 and/or the temperature homogeneity of the glass melt.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method of conditioning and homogenizing a continuously flowing stream of glass along a conditioning stretch located in one of a working end, a distribution channel, a feeder or a forehearth, the conditioning stretch extending from an entry side either of said working end, distribution channel, feeder or forehearth to at least one extraction point at the end of said conditioning stretch and at the beginning of said conditioning stretch there is a cooling zone to which a homogenizing zone for the glass temperature is connected, whereby the glass temperature in the conditioning stretch is reduced from an entry temperature T1 to an extraction temperature T2, comprising the steps of:

arranging for a vertical cross section of the glass stream in the cooling zone to have a depth/width ratio D/W of a maximum 0.6, whereby a maximum depth Dmax of the glass stream amounts to
  (a) 300 mm when the cooling zone is situated in said working end or in said distribution channel; and
  (b) 150 mm when the cooling zone is situated in said feeder or in said forehearth; and removing at least 30% of that amount of energy which corresponds to a temperature difference between T1 and T2 from the glass stream per meter of flow along the conditioning stretch at the beginning of the cooling zone.

2. A method according to claim 1 wherein said vertical cross section of the glass stream in the cooling zone is arranged to have a depth/width ratio D/W of a maximum 0.5.

3. A method according to claim 1, wherein said vertical cross section of the glass stream in the cooling zone is arranged to have a depth/width ratio DAN of a maximum 0.4.

4. A method according to claim 1, wherein said vertical cross section of the glass stream in the cooling zone is arranged to have a depth/width ratio D/W of a maximum 0.3.

5. A method according to claim 1, wherein said vertical cross section of the glass stream in the cooling zone is arranged to have a depth/width ratio D/W of a maximum 0.2.

6. A method according to claim 1, wherein when the cooling zone is situated in said working end or said distribution channel the maximum depth Dmax is reduced to a depth that does not exceed 250 mm.

7. A method according to claim 1, wherein when the cooling zone is situated in said working end or said distribution channel the maximum depth Dmax is reduced to a depth that does not exceed 200 mm.

8. A method according to claim 1 wherein when the cooling zone is situated in said feeder or said forehearth the maximum depth Dmax is reduced to a depth that does not exceed 120 mm.

9. A method according to claim 1, wherein when the cooling zone is situated in said feeder or said forehearth the maximum depth Dmax is reduced to a depth that does not exceed 100 mm.

10. A method according to claim 1, wherein at least 40% of the amount of energy which corresponds to the temperature difference between T1 and T2 is removed from the glass stream per meter of flow along the conditioning stretch at the beginning of the cooling zone.

11. A method according to claim 1, wherein the flowing stream of glass in the cooling zone is maintained essentially straight.

12. A method according the claim 1, wherein the velocity of the flowing stream of glass in the cooling zone is higher than the velocity of the flowing stream of glass before and after the cooling zone.

13. A method according to claim 1, including the steps of positioning an immersion cooler in the flowing stream of glass downstream of the cooling zone and wherein the immersion cooler is raised and lowered relative to said glass stream.

14. A method according to claim 1, including the step of positioning an immersion cooler in the flowing stream of glass, down stream of the cooling zone and wherein the immersion cooler is moved horizontally at right angles to the direction of flow of said glass stream.

15. A method of conditioning a glass stream along a conditioning stretch located in one of a working end, a distribution channel, a feeder or a forehearth, the conditioning stretch extending from an entry side of said working end, distribution channel, feeder or forehearth to at least one extraction point at the end of said conditioning stretch, and at the beginning of said conditioning stretch there is a cooling zone to which a homogenizing zone for the glass temperature is connected, whereby the glass temperature in the conditioning stretch is reduced from an entry temperature T1 to an extraction temperature T2, comprising the steps of:

controlling a flow rate of the glass stream and providing an arrangement of walls in the cooling zone such that a vertical cross section of the glass stream in the cooling zone has a depth/width ratio D/W of a maximum 0.6, whereby a maximum depth Dmax of the glass stream amounts to
  (a) 300 mm when the cooling zone is situated in said working end or in said distribution channel; and
  (b) 150 mm when the cooling zone is situated in said feeder or in said forehearth; and removing at least 30% of that amount of energy which corresponds to a temperature difference between T1 and T2 from the glass stream per meter of flow in the cooling zone.

* * * * *